(12) United States Patent
Pijewski et al.

(10) Patent No.: US 8,782,224 B2
(45) Date of Patent: *Jul. 15, 2014

(54) SYSTEMS AND METHODS FOR TIME-BASED DYNAMIC ALLOCATION OF RESOURCE MANAGEMENT

(71) Applicants: William D. Pijewski, San Francisco, CA (US); Gerald A. Jelinek, Colorado Springs, CO (US); Brendan Gregg, Walnut Creek, CA (US); Bryan Cantrill, Piedmont, CA (US)

(72) Inventors: William D. Pijewski, San Francisco, CA (US); Gerald A. Jelinek, Colorado Springs, CO (US); Brendan Gregg, Walnut Creek, CA (US); Bryan Cantrill, Piedmont, CA (US)

(73) Assignee: Joyent, Inc., San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/899,543

(22) Filed: May 21, 2013

(65) Prior Publication Data

US 2013/0254407 A1 Sep. 26, 2013

Related U.S. Application Data

(63) Continuation-in-part of application No. 13/340,461, filed on Dec. 29, 2011, now Pat. No. 8,468,251.

(60) Provisional application No. 61/782,697, filed on Mar. 14, 2013.

(51) Int. Cl.
*G06F 15/16* (2006.01)

(52) U.S. Cl.
USPC ............ 709/224; 709/226; 709/203; 709/233

(58) Field of Classification Search
None
See application file for complete search history.

(56) References Cited

U.S. PATENT DOCUMENTS

| | | | |
|---|---|---|---|
| 6,393,495 B1 | 5/2002 | Flory et al. |
| 6,553,391 B1 | 4/2003 | Goldring et al. |
| 6,901,594 B1 | 5/2005 | Cain et al. |
| 7,222,345 B2 | 5/2007 | Gray et al. |
| 7,265,754 B2 | 9/2007 | Brauss |
| 7,379,994 B2 | 5/2008 | Collazo |
| 7,437,730 B2 | 10/2008 | Goyal |
| 7,529,780 B1 | 5/2009 | Braginsky et al. |
| 7,581,219 B2 | 8/2009 | Neiger et al. |
| 7,603,671 B2 | 10/2009 | Liu |

(Continued)

FOREIGN PATENT DOCUMENTS

| | | |
|---|---|---|
| WO | 2011/088224 | 7/2011 |
| WO | WO2012125143 | 9/2012 |
| WO | WO2012125144 | 9/2012 |

OTHER PUBLICATIONS

Yagoubi, Belabbas et al., "Load Balancing in Grid Computing," Asian Journal of Information Technology, vol. 5, No. 10, pp. 1095-1103, 2006.

(Continued)

*Primary Examiner* — Djenane Bayard
(74) *Attorney, Agent, or Firm* — Carr & Ferrell LLP (57) ABSTRACT

Systems, methods, and media for method for managing requests for computing resources. Methods may include dynamically throttling requests for computing resources generated by one or more tenants within a multi-tenant system, such as a cloud. In some embodiments, the present technology may dynamically throttle I/O operations for a physical storage media that is accessible by the tenants of the cloud. The present technology may dynamically throttle I/O operations to ensure fair access to the physical storage media for each tenant within the cloud.

24 Claims, 4 Drawing Sheets

(56) References Cited

U.S. PATENT DOCUMENTS

| | | | |
|---|---|---|---|
| 7,640,547 | B2 | 12/2009 | Neiman et al. |
| 7,685,148 | B2 | 3/2010 | Engquist et al. |
| 7,774,457 | B1 | 8/2010 | Talwar et al. |
| 7,814,465 | B2 | 10/2010 | Liu |
| 7,849,111 | B2 | 12/2010 | Huffman et al. |
| 7,899,901 | B1 | 3/2011 | Njemanze et al. |
| 7,904,540 | B2 | 3/2011 | Hadad et al. |
| 7,917,599 | B1 | 3/2011 | Gopalan et al. |
| 7,933,870 | B1 | 4/2011 | Webster |
| 7,940,271 | B2 | 5/2011 | Wright et al. |
| 8,006,079 | B2 | 8/2011 | Goodson et al. |
| 8,010,498 | B2 | 8/2011 | Gounares et al. |
| 8,141,090 | B1 | 3/2012 | Graupner et al. |
| 8,181,182 | B1 | 5/2012 | Martin |
| 8,301,746 | B2 | 10/2012 | Head et al. |
| 8,336,051 | B2 | 12/2012 | Gokulakannan |
| 8,346,935 | B2 | 1/2013 | Mayo et al. |
| 8,370,936 | B2 | 2/2013 | Zuk et al. |
| 8,417,673 | B2 | 4/2013 | Stakutis et al. |
| 8,417,746 | B1 | 4/2013 | Gillett, Jr. et al. |
| 8,429,282 | B1* | 4/2013 | Ahuja et al. .................. 709/229 |
| 8,434,081 | B2 | 4/2013 | Cervantes et al. |
| 8,468,251 | B1 | 6/2013 | Pijewski et al. |
| 8,547,379 | B2 | 10/2013 | Pacheco et al. |
| 8,555,276 | B2 | 10/2013 | Hoffman et al. |
| 8,631,131 | B2 | 1/2014 | Kenneth et al. |
| 8,677,359 | B1 | 3/2014 | Cavage et al. |
| 2002/0069356 | A1 | 6/2002 | Kim |
| 2002/0082856 | A1 | 6/2002 | Gray et al. |
| 2002/0156767 | A1 | 10/2002 | Costa et al. |
| 2002/0198995 | A1 | 12/2002 | Liu et al. |
| 2003/0154112 | A1* | 8/2003 | Neiman et al. .................... 705/5 |
| 2003/0163596 | A1 | 8/2003 | Halter et al. |
| 2004/0088293 | A1 | 5/2004 | Daggett |
| 2005/0097514 | A1 | 5/2005 | Nuss |
| 2005/0108712 | A1 | 5/2005 | Goyal |
| 2005/0188075 | A1 | 8/2005 | Dias et al. |
| 2006/0107087 | A1 | 5/2006 | Sieroka et al. |
| 2006/0153174 | A1 | 7/2006 | Towns-von Stauber et al. |
| 2006/0218285 | A1 | 9/2006 | Talwar et al. |
| 2006/0246879 | A1 | 11/2006 | Miller et al. |
| 2006/0248294 | A1 | 11/2006 | Nedved et al. |
| 2006/0294579 | A1 | 12/2006 | Khuti et al. |
| 2007/0088703 | A1 | 4/2007 | Kasiolas et al. |
| 2007/0118653 | A1* | 5/2007 | Bindal .......................... 709/226 |
| 2007/0168336 | A1 | 7/2007 | Ransil et al. |
| 2007/0179955 | A1 | 8/2007 | Croft et al. |
| 2007/0250838 | A1 | 10/2007 | Belady et al. |
| 2007/0271570 | A1* | 11/2007 | Brown et al. .................. 718/105 |
| 2008/0080396 | A1 | 4/2008 | Meijer et al. |
| 2008/0103861 | A1 | 5/2008 | Zhong |
| 2008/0155110 | A1 | 6/2008 | Morris |
| 2009/0044188 | A1 | 2/2009 | Kanai et al. |
| 2009/0077235 | A1 | 3/2009 | Podila |
| 2009/0164990 | A1 | 6/2009 | Ben-Yehuda et al. |
| 2009/0172051 | A1 | 7/2009 | Huffman et al. |
| 2009/0193410 | A1 | 7/2009 | Arthursson et al. |
| 2009/0216910 | A1 | 8/2009 | Duchesneau |
| 2009/0259345 | A1 | 10/2009 | Kato et al. |
| 2009/0260007 | A1 | 10/2009 | Beaty et al. |
| 2009/0300210 | A1 | 12/2009 | Ferris |
| 2010/0050172 | A1 | 2/2010 | Ferris |
| 2010/0057913 | A1 | 3/2010 | DeHaan |
| 2010/0106820 | A1 | 4/2010 | Gulati et al. |
| 2010/0114825 | A1 | 5/2010 | Siddegowda |
| 2010/0125845 | A1 | 5/2010 | Sugumar et al. |
| 2010/0131324 | A1 | 5/2010 | Ferris |
| 2010/0131854 | A1 | 5/2010 | Little |
| 2010/0153958 | A1 | 6/2010 | Richards et al. |
| 2010/0162259 | A1 | 6/2010 | Koh et al. |
| 2010/0223383 | A1 | 9/2010 | Salevan et al. |
| 2010/0223385 | A1 | 9/2010 | Gulley et al. |
| 2010/0228936 | A1 | 9/2010 | Wright et al. |
| 2010/0235632 | A1* | 9/2010 | Iyengar et al. ............... 713/166 |
| 2010/0250744 | A1 | 9/2010 | Hadad et al. |
| 2010/0262752 | A1 | 10/2010 | Davis et al. |
| 2010/0268764 | A1 | 10/2010 | Wee et al. |
| 2010/0299313 | A1 | 11/2010 | Orsini et al. |
| 2010/0306765 | A1 | 12/2010 | DeHaan |
| 2010/0306767 | A1 | 12/2010 | Dehaan |
| 2010/0318609 | A1 | 12/2010 | Lahiri et al. |
| 2010/0332629 | A1 | 12/2010 | Cotugno et al. |
| 2010/0333087 | A1 | 12/2010 | Vaidyanathan et al. |
| 2011/0004566 | A1 | 1/2011 | Berkowitz et al. |
| 2011/0016214 | A1 | 1/2011 | Jackson |
| 2011/0029969 | A1 | 2/2011 | Venkataraja et al. |
| 2011/0029970 | A1 | 2/2011 | Arasaratnam |
| 2011/0047315 | A1 | 2/2011 | De Dinechin et al. |
| 2011/0055396 | A1 | 3/2011 | DeHaan |
| 2011/0055398 | A1 | 3/2011 | Dehaan et al. |
| 2011/0078303 | A1 | 3/2011 | Li et al. |
| 2011/0107332 | A1 | 5/2011 | Bash |
| 2011/0131306 | A1 | 6/2011 | Ferris et al. |
| 2011/0131329 | A1 | 6/2011 | Kaplinger et al. |
| 2011/0131589 | A1 | 6/2011 | Beaty et al. |
| 2011/0138382 | A1 | 6/2011 | Hauser et al. |
| 2011/0138441 | A1 | 6/2011 | Neystadt et al. |
| 2011/0145392 | A1 | 6/2011 | Dawson et al. |
| 2011/0153724 | A1* | 6/2011 | Raja et al. ..................... 709/203 |
| 2011/0161952 | A1 | 6/2011 | Poddar et al. |
| 2011/0173470 | A1 | 7/2011 | Tran |
| 2011/0179132 | A1 | 7/2011 | Mayo et al. |
| 2011/0179134 | A1 | 7/2011 | Mayo et al. |
| 2011/0179162 | A1 | 7/2011 | Mayo et al. |
| 2011/0185063 | A1 | 7/2011 | Head et al. |
| 2011/0219372 | A1 | 9/2011 | Agrawal et al. |
| 2011/0270968 | A1 | 11/2011 | Salsburg et al. |
| 2011/0276951 | A1 | 11/2011 | Jain |
| 2011/0296021 | A1 | 12/2011 | Dorai et al. |
| 2011/0302378 | A1 | 12/2011 | Siebert |
| 2011/0302583 | A1 | 12/2011 | Abadi et al. |
| 2011/0320520 | A1 | 12/2011 | Jain |
| 2012/0017210 | A1 | 1/2012 | Huggins et al. |
| 2012/0054742 | A1 | 3/2012 | Eremenko et al. |
| 2012/0060172 | A1 | 3/2012 | Abouzour |
| 2012/0066682 | A1 | 3/2012 | Al-Aziz et al. |
| 2012/0079480 | A1 | 3/2012 | Liu |
| 2012/0089980 | A1 | 4/2012 | Sharp et al. |
| 2012/0124211 | A1 | 5/2012 | Kampas et al. |
| 2012/0131156 | A1 | 5/2012 | Brandt et al. |
| 2012/0131591 | A1 | 5/2012 | Moorthi et al. |
| 2012/0159507 | A1 | 6/2012 | Kwon et al. |
| 2012/0167081 | A1 | 6/2012 | Sedayao et al. |
| 2012/0173709 | A1 | 7/2012 | Li et al. |
| 2012/0179874 | A1 | 7/2012 | Chang et al. |
| 2012/0185913 | A1 | 7/2012 | Martinez et al. |
| 2012/0198442 | A1 | 8/2012 | Kashyap et al. |
| 2012/0204176 | A1 | 8/2012 | Tian et al. |
| 2012/0221845 | A1 | 8/2012 | Ferris |
| 2012/0233315 | A1 | 9/2012 | Hoffman et al. |
| 2012/0233626 | A1 | 9/2012 | Hoffman et al. |
| 2012/0246517 | A1 | 9/2012 | Bender et al. |
| 2012/0266231 | A1 | 10/2012 | Spiers et al. |
| 2012/0284714 | A1 | 11/2012 | Venkitachalam et al. |
| 2012/0303773 | A1 | 11/2012 | Rodrigues |
| 2012/0311012 | A1 | 12/2012 | Mazhar et al. |
| 2013/0042115 | A1 | 2/2013 | Sweet et al. |
| 2013/0060946 | A1 | 3/2013 | Kenneth et al. |
| 2013/0067067 | A1 | 3/2013 | Miri et al. |
| 2013/0081016 | A1 | 3/2013 | Saito et al. |
| 2013/0086590 | A1 | 4/2013 | Morris et al. |
| 2013/0129068 | A1* | 5/2013 | Lawson et al. ................ 379/242 |
| 2013/0132057 | A1* | 5/2013 | Deng et al. ..................... 703/21 |
| 2013/0169666 | A1 | 7/2013 | Pacheco et al. |
| 2013/0173803 | A1 | 7/2013 | Pijewski et al. |
| 2013/0179881 | A1 | 7/2013 | Calder et al. |
| 2013/0191835 | A1 | 7/2013 | Araki |
| 2013/0191836 | A1 | 7/2013 | Meyer |
| 2013/0318525 | A1 | 11/2013 | Palanisamy et al. |
| 2013/0328909 | A1 | 12/2013 | Pacheco et al. |

(56) References Cited

U.S. PATENT DOCUMENTS

2013/0339966 A1    12/2013   Meng et al.
2013/0346974 A1    12/2013   Hoffman et al.

OTHER PUBLICATIONS

Kramer, "Advanced Message Queuing Protocol (AMQP)," Linux Journal, Nov. 2009, p. 1-3.
Subramoni et al., "Design and Evaluation of Benchmarks for Financial Applications Using Advanced Message Queuing Protocol (AMQP) over InfiniBand," Nov. 2008.
Richardson et al., "Introduction to RabbitMQ," Sep. 2008, p. 1-33.
Bernstein et al., "Using XMPP as a Transport in Intercloud Protocols," Jun. 22, 2010, p. 1-8.
Bernstein et al., "Blueprint for the Intercloud—Protocols and Formats for Cloud Computing Interoperabiilty," May 28, 2009, p. 328-336.
Gregg, Brendan, "Visualizing System Latency," May 1, 2010, ACM Queue, p. 1-13, http://queue.acm.org/detail.cfm?id=1809426.
Gregg, Brendan, "Heat Map Analytics," Mar. 17, 2009, Oracle, p. 1-7, https://blogs.oracle.com/brendan/entry/heat_map_analytics.
Mundigl, Robert, "There is More Than One Way to Heat a Map," Feb. 10, 2009, Clearly and Simply, p. 1-12, http://www.clearlyandsimply.com/clearly_and_simply/2009/02/there-is-more-than-one-way-to-heat-a-map.html.
Bi et al. "Dynamic Provisioning Modeling for Virtualized Multi-tier Applications in Cloud Data Center". 2010 IEEE 3rd International Conference on Cloud Computing. pp. 370-377.
Chappell, David. "Introducing Windows Azure". Microsoft Corporation. Oct. 2010. pp. 1-25.
Non-Final Office Action, Aug. 12, 2013, U.S. Appl. No. 13/046,660, filed Mar. 11, 2011.
Notice of Allowance, Jun. 3, 2013, U.S. Appl. No. 13/046,647, filed Mar. 11, 2011.
Notice of Allowance, May 23, 2013, U.S. Appl. No. 13/340,488, filed Dec. 29, 2011.
Non-Final Office Action, Jul. 29, 2013, U.S. Appl. No. 13/829,250, filed Mar. 14, 2013.
Non-Final Office Action, Jul. 29, 2013, U.S. Appl. No. 13/899,543, filed May 21, 2013.
Chef Documents. Retrieved Mar. 11, 2014 from http://docs.opscode.com/.
Ansible Documentation. Retrieved Mar. 11, 2014 from http://docs.ansible.com/.
Bill Pijewski's Blog. Retrieved Mar. 12, 2014 from http://dtrace.org/blogs/wdp/2011/03/our-zfs-io-throttle/.
Brendan's Blog. Retrieved Mar. 12, 2014 from http://dtrace.org/blogs/brendan/2011/03/08/busy-week-zfs-throttling-dtrace-node-js-and-cloud-analytics/.
Joyent ZFS Performance Analysis and Tools. Retrieved Mar. 12, 2014 from http://www.slideshare.net/brendangregg/zfsperftools2012.
Block 10 Controller. Retrieved Mar. 12, 2014 from https://www.kernel.org/doc/Documentation/cgroups/blkio-controller.txt.
Block Device Bio Throttling Support. Retrieved Mar. 12, 2014 from https://lwn.net/Articles/403889/.
Gregg, Brendan. Systems Performance: Enterprise and the Cloud, Prentice Hall, 2014, pp. 557-558.
Mesnier, Michael. I/O throttling. 2006. Retrieved Apr. 13, 2014 from https://www.usenix.org/legacy/event/fast07/tech/full_papers/mesnier/mesnier_html/node5.html.

\* cited by examiner

SYSTEMS AND METHODS FOR TIME-BASED DYNAMIC ALLOCATION OF RESOURCE MANAGEMENT

CROSS-REFERENCE TO RELATED APPLICATIONS

This nonprovisional application is a continuation-in-part application that claims priority benefit of U.S. application Ser. No. 13/340,461 filed on Dec. 29, 2011, and this application also claims priority benefit of U.S. Provisional Patent Application No. 61/782,697, filed Mar. 14, 2013, the contents of which are hereby incorporated by reference.

FIELD OF THE TECHNOLOGY

Embodiments of the disclosure relate to the management of cloud-based computing environments. Systems, methods, and media provided herein may be utilized for time-based dynamic allocation of resource management.

BACKGROUND OF THE DISCLOSURE

A cloud is a resource that typically combines the computational power of a large grouping of processors and/or that combines the storage capacity of a large grouping of computer memories or storage devices. For example, systems that provide a cloud resource may be utilized exclusively by their owners, such as Google™ or Yahoo!™, or such systems may be accessible to outside users who deploy applications within the computing infrastructure to obtain the benefit of large computational or storage resources.

The cloud may be formed, for example, by a network of servers, with each server (or at least a plurality thereof) providing processor and/or storage resources. These servers may manage workloads provided by multiple users (e.g., cloud resource customers or other users). Typically, each user places workload demands upon the cloud that vary in real-time, sometimes dramatically. The nature and extent of these variations may depend on the type of business associated with the user.

SUMMARY OF THE DISCLOSURE

According to some embodiments, the present technology may be directed to methods for managing requests for computing resources by dynamically throttling requests for computing resources generated by one or more tenants within a multi-tenant system, the requests being directed to a computing resource, the requests of a tenant being selectively throttled based upon a comparison of a usage metric and priority for the tenant.

According to other embodiments, the present technology may be directed to methods for managing requests for computing resources by dynamically throttling requests for computing resources generated by one or more tenants within a multi-tenant system, the requests being directed to a computing resource that receives fluctuating quantities of requests from the multi-tenant system, wherein the one or more tenants that are selectively throttled are determined by comparing a raw number of requests generated each tenant and selecting one or more of tenants with the greatest amount of requests relative to the other tenants.

According to additional embodiments, the present technology may be directed to systems for managing requests for computing resources. These systems may include: (a) a processor that executes computer-readable instructions; (b) a memory for storing executable instructions that include an operating system that has a filesystem; and (c) a throttling module that manages requests for computing resources by dynamically throttling requests for computing resources generated by one or more tenants within a multi-tenant system, the requests being directed to a computing resource that receives fluctuating quantities of requests from the multi-tenant system, the requests of a tenant being selectively throttled based upon a comparison of a usage metric and priority for the tenant.

According to additional embodiments, the present technology may be directed to computer readable storage media for managing requests for computing resources. The method may include dynamically throttling requests for computing resources generated by one or more tenants within a multi-tenant system, the requests being directed to a computing resource that receives fluctuating quantities of requests from the multi-tenant system, the requests of a tenant being selectively throttled based upon a comparison of a usage metric and priority for the tenant.

BRIEF DESCRIPTION OF THE DRAWINGS

The accompanying drawings, where like reference numerals refer to identical or functionally similar elements throughout the separate views, together with the detailed description below, are incorporated in and form part of the specification, and serve to further illustrate embodiments of concepts that include the claimed disclosure, and explain various principles and advantages of those embodiments.

The methods and systems disclosed herein have been represented where appropriate by conventional symbols in the drawings, showing only those specific details that are pertinent to understanding the embodiments of the present disclosure so as not to obscure the disclosure with details that will be readily apparent to those of ordinary skill in the art having the benefit of the description herein.

DETAILED DESCRIPTION

In the following description, for purposes of explanation, numerous specific details are set forth in order to provide a thorough understanding of the disclosure. It will be apparent, however, to one skilled in the art, that the disclosure may be practiced without these specific details. In other instances, structures and devices are shown in block diagram form only in order to avoid obscuring the disclosure.

Generally speaking, the present technology may control access to a computing resource(s) that is subject to an unknown/unpredictable number of requests (e.g., workload). In some instances, these computing resources are physical components that are constrained by a finite number of possible requests that they may process within a given time frame. For example, a physical storage media may only be able to process up to a thousand read and/or write requests per second.

In some embodiments, the present technology may be utilized in multi-tenant systems. Multi-tenant systems may impose dynamic and drastically varying workloads on computing resources of a cloud. An exemplary computing resource may include a physical storage medium such as a hard disk. Workload imposed on the computing resource may include I/O operations (e.g., read and write operations) and/or network bandwidth usage. Because physical systems such as hard disks have finite operational constraints (e.g., maximum amount of I/O requests that can be fulfilled in a given timespan), monopolization of these resources by one or more tenants in a multi-tenant system may lead to pathological latency issues for the other tenants as they must wait for the computing resource. Such latency issues will diminish the overall performance of the other tenants.

To address these issues, the present technology may dynamically limit the workload from a tenant applied to the computing resource based upon the number of tenants providing such workloads to the computing resource for processing. Workloads may be understood to include I/O (e.g., input/output, read/write) operations for a computing resource such as a physical storage media, but may also include any quantifiable request that is based upon the process that is executed by the computing resource.

More specifically, when designing a cloud computing platform, a cloud provider may desire to mitigate any performance vagaries due to multi-tenant effects. As stated previously, a cloud computing environment may include a physical machine or plurality of machines that provision a plurality of tenants (e.g., zones) for customers. Groups of tenants are often referred to as multi-tenancy environment.

The terms multi-tenant may be understood to include not only cloud environments, but also other configurations of computing devices/resources, such as an enterprise system that may have both primary and secondary computing resources. The present technology may ensure that primary resources have adequate access to computing resources such as databases or other storage media, while preserving the ability for secondary computing devices to access the storage media on a throttled basis, if necessary.

Because the workload imposed upon a computing resource by each tenant may not be consistent and uniformly distributed, bursts of activity (increases in workload) may affect the performance of other tenants. These tenants may be virtual machines utilizing the system's computing resources, or single applications running on that system. For example, when one tenant monopolizes the available I/O operations of a physical storage media, other tenants may be required to wait for unacceptable periods of time to access the physical storage media.

One way to avoid these multi-tenant effects is to overprovision the cloud to handle spikes in activity (e.g., provide additional physical storage media), but that approach may leave machines or components of the cloud underutilized and may undermine the economics of cloud computing.

The present technology may employ a software virtualized solution within a cloud platform, wherein each tenant is a container built into the underlying operating system of the cloud. The present technology may provision a tenant (also known as a zone) for each customer, and this architecture grants the system additional flexibility when allocating resources to individual tenants. The present technology may observe the activity of all tenants, and can coordinate with the kernel of the cloud to optimize resource management between tenants.

Generally speaking, the four basic computing resources that may require provisioning with a cloud include CPU, memory, I/O, and network bandwidth. For many customer workloads, network bandwidth may occasionally present a bottleneck, and such bottlenecking may increase as applications become more and more distributed.

I/O contention can also be major factor that negatively impacts customers. For example, on one machine, a single tenant can issue a stream of I/O operations, usually synchronous writes, which disrupt I/O operations for all other tenants. This problem is further exacerbated by filesystem management functionalities, which may buffer asynchronous writes for a single transaction group. These asynchronous writes may include a set of data blocks which are atomically flushed to disk. The process of flushing a filesystem transaction group may occupy all or a significant portion of a computing device's (e.g., a storage media) I/O bandwidth, thereby preventing pending read operations by other tenants.

According to some embodiments, the present technology may employ an I/O throttling functionality to remedy I/O contention. The I/O throttling functionality may be generally described as having two components. The first component may monitor and account for each tenant's I/O operations. A second component may throttle each tenant's operations when it exceeds a fair share of disk I/O. When the throttle detects that a tenant is consuming more than is appropriate, each read or write system call is delayed by up to 200 microseconds, which may be sufficient to allow other tenants to interleave I/O requests during those delays. I/O throttling functionality may calculate an I/O usage metric for each tenant, as will be described in greater detail below. It will be understood that while some embodiments of the present technology may implement a delay of up to 200 microseconds, the actual delay imposed by the system may include any duration desired.

The present technology may prioritize I/O access amongst the tenants, such that certain tenants may be granted prioritized access to the I/O component. These types of prioritizations may be referred to as a "priority," If desired, each tenant may be provisioned with a usage metric and the I/O throttling functionality may monitor I/O usage across the zones and compare I/O usage for each tenant to its usage metric. If a zone has a higher-than-average I/O usage (compared to their usage metric), the I/O throttling functionality may throttle or temporarily suspend I/O requests from the tenant to the I/O device. That is, each I/O request may be delayed up to 200 microseconds, depending on the severity of the inequity between the various tenants.

Additionally, the delay applied to the I/O requests may be increased and/or decreased in a stepwise fashion, based upon a velocity of the I/O requests for the tenant. These and other advantages of the present technology will be described in greater detail with reference to the collective figures.

Figure 1:
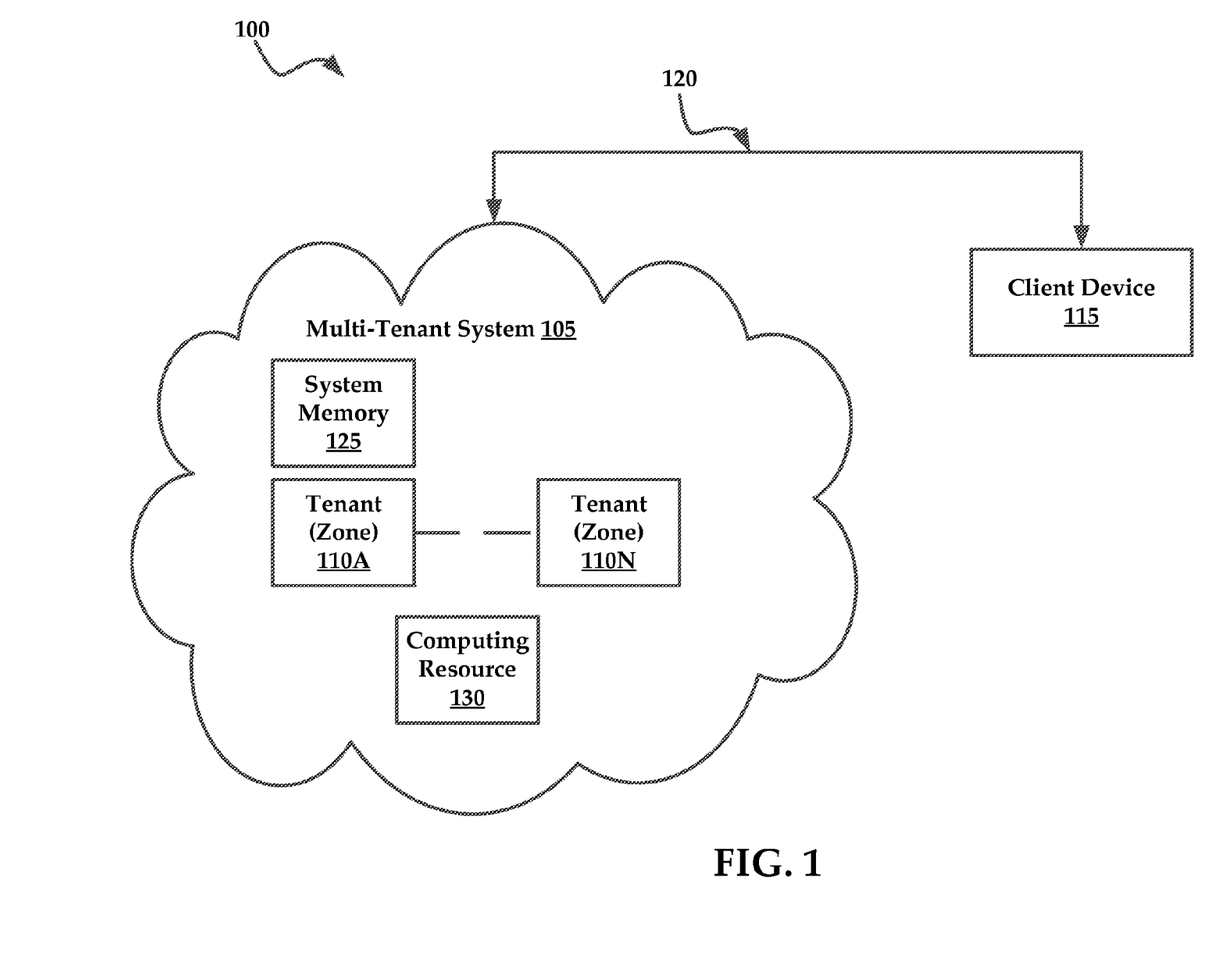
FIG. 1 illustrates an exemplary system for practicing aspects of the present technology.

FIG. 1 illustrates an exemplary system 100 for practicing aspects of the present technology. The system 100 may include a multi-tenant system 105 that may include a cloud-based computing environment. As stated above, a cloud-based computing environment is a resource that typically combines the computational power of a large grouping of processors and/or that combines the storage capacity of a large grouping of computer memories or storage devices. For example, systems that provide a cloud resource may be utilized exclusively by their owners, such as Google™ or Yahoo!™; or such systems may be accessible to outside users who deploy applications within the computing infrastructure to obtain the benefit of large computational or storage resources.

The cloud may be formed, for example, by a network of servers, with each server (or at least a plurality thereof) providing processor and/or storage resources. These servers may manage workloads provided by multiple users (e.g., cloud resource customers or other users). Typically, each user places workload demands upon the cloud that vary in real-time, sometimes dramatically. The nature and extent of these variations typically depend on the type of business associated with the user.

In some embodiments, the cloud includes a plurality of tenants 110A-N (e.g., zones), where each tenant may represent a virtual computing system for a customer. Each tenant may be configured to perform one or more computing operations such as hosting a web page, enabling a web-based application, facilitating data storage, and so forth.

In other embodiments, the multi-tenant system 105 may include a distributed group of computing devices such as servers that do not share computing resources or workload. Additionally, the multi-tenant system 105 may include a single computing device that has been provisioned with a plurality of programs that each produce instances of event data.

The multi-tenant system 105 may provide the tenants 110A-N with a plurality of computing resources, which may be either virtual or physical components. For the purposes of brevity, the following description may specifically describe a computing resource 130 that includes a physical storage media such as a hard disk. Again, the computing resource 130 may include physical devices that have operational constraints that can be defined in terms of a finite quantity. For example, an upper limit for the amount of I/O requests that can be handled by the computing resource 130 over a given period of time.

Customers or system administrators may utilize client devices 115 to access their tenant within the multi-tenant system 105. Additionally, the individual parts of the system 100 may be communicatively coupled with one another via a network connection 120. The network connection may include any number or combination of private and/or public communications media, such as the Internet. The multi-tenant system 105 may include a system memory 125.

Figure 2:
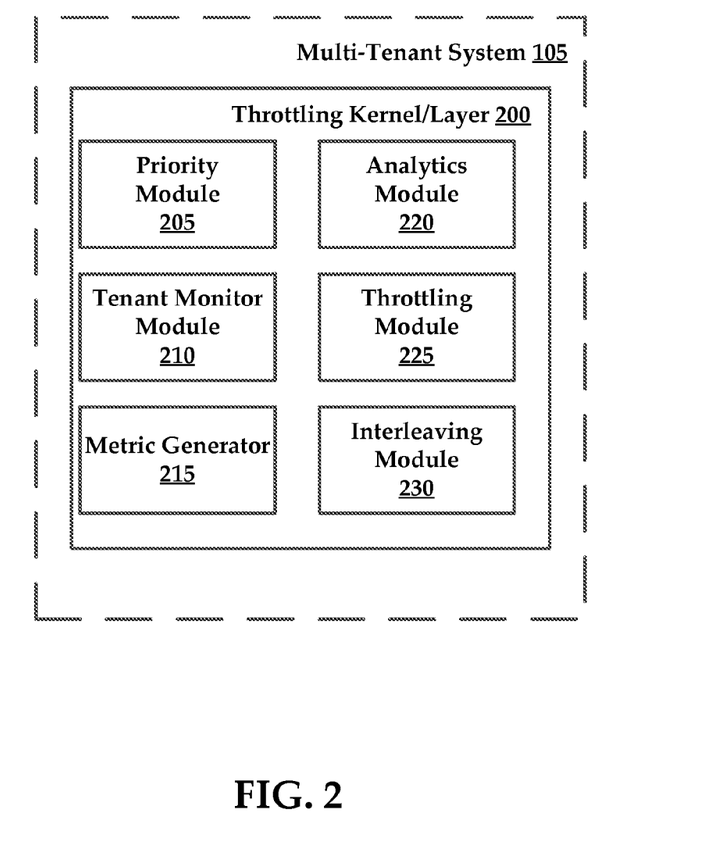
FIG. 2 illustrates a throttling kernel that manages requests for computing resources.

The filesystem of the multi-tenant system 105 may be provisioned with a throttling layer or "kernel 200," which will be described in greater detail with regard to FIG. 2. The throttling kernel 200 may also be embodied as a standalone application that is executable on the multi-tenant system 105. The throttling kernel 200 may be executed to selectively throttle requests for computing resources generated by one or more tenants within a multi-tenant system 105. It will be understood that the requests may be directed to a computing resource that receives fluctuating quantities of requests from the multi-tenant system. Furthermore, the requests generated by a tenant may be selectively throttled based upon a comparison of a usage metric and priority for the tenant.

According to some embodiments, the throttling kernel 200 may comprise a priority module 205, a tenant monitor module 210, a metric generator 215, an analytics module 220, a throttling module 225, and an interleaving module 230. It is noteworthy that the throttling kernel 200 may include additional or fewer modules, engines, or components, and still fall within the scope of the present technology. As used herein, the term "module" may also refer to any of an application-specific integrated circuit (ASIC), an electronic circuit, a processor (shared, dedicated, or group) that executes one or more software or firmware programs, a combinational logic circuit, and/or other suitable components that provide the described functionality.

Prior to throttling request of tenants within the multi-tenant system, a system administrator may interact with the throttling kernel 200 to establish guidelines that govern the behavior of the throttling kernel 200. For a particular computing resource such as a physical storage media that may be accessed by the tenants 110A-N, the system administrator may determine threshold request levels that represent the physical constraints of the computing resource. For example, the system administrator may estimate that the maximum number of I/O requests that a physical storage media may handle within a one second period of time is approximately 1,000.

It will be understood that while the throttling kernel 200 may be utilized to manage requests provided by tenants to any number of computing resources, for the purposes of brevity, the following descriptions will be limited to a computing resources such as a physical storage medium (e.g., hard disk).

Based upon this threshold information, in some instances, the priority module 205 may be executed to generate a global priority value for each tenant 110A-N within the multi-tenant system 105. The global priority value defines an acceptable usage relative to other tenants that may be generated by each tenant. The relative global priority values of tenants determine their relative access to the computing resource, such as a hard disk. The use of global priority values will be discussed in greater detail infra.

In other embodiments, the priority module 205 may generate a tenant specific priority value for each tenant in the multi-tenant system. A tenant specific priority value may be generated by a pricing schedule provided by the multi-tenant system operator. For example, a customer may obtain higher priority by purchasing additional computing resources from the operator. In other cases, increased priority may be obtained by customers purchasing multiple tenants, or other price-based methods that would be known to one of ordinary skill in the art.

The priority module 205 may also distribute available requests across the tenants relative to a weighting of tenants that is based upon their respective priority values. That is, a tenant with greater priority may receive a greater percentage of the available requests for the computing resource.

In some instances, the priority module 205 may not consider a priority for a tenant that has not generated an I/O request or other access to a computing resource within a given timespan. Moreover, these tenants are not considered when comparing global priorities to determine preferential access to the computing resource. Such provisioning ensures that the computing resource is not idle and is being utilized to its fullest potential.

Once priorities have been established for the tenants, the tenant monitor module 210 may be executed to monitor the I/O requests generated by each of the tenants. These I/O requests represent workload that will be placed upon the computing resource when transmitted to the resource. For example, the I/O requests may include read and write requests for the physical disk that were generated by the tenants. The tenant monitor module 210 may obtain raw request numbers for each tenant within the system. By way of non-limiting example, the tenant monitor module 210 may continually obtain raw data from a tenant that includes all I/O requests that were generated by the tenant in the last two seconds.

Once the raw data has been gathered, the metric generator 215 may be executed to calculate usage metrics for each of the tenants. Usage metrics are generated by processing the raw data for a tenant. In some embodiments, the metric generator 215 takes the raw request data generated during a timespan to generate an automatically updated usage metric. The metric is generated by multiplying an aggregate number of read requests for a tenant over the timespan by an average read latency relative to the computing resource, plus the product of the number of write requests and the average write latency relative to the computing resource.

It will be understood that the usage metric has been referred to as an "automatically updated" metric because the metric generator continually receives raw data from the tenant and updates the usage metric to continually measure the I/O requests generated by a tenant in near real-time. That is, I/O requests for a tenant are typically a fluctuating and variable quantity. Tenant may have periods of high or sustained I/O request generation and may also have periods of relatively little or no I/O request generation. Monitoring and automatically processing the I/O requests generated by the tenants ensure that access to the computing resource may be fairly distributed across the tenants as their I/O requests fluctuate.

The metric generator 215 may weigh the raw data based upon temporal aspects of the raw data. For example, new I/O requests may be given greater weight than relatively older I/O requests. Therefore, in some instances, the metric generator 215 may calculate an exponentially decayed average which may be included in the aggregate numbers of read and write requests. It is noteworthy that this average may include I/O requests from a tenant that occurred prior to current I/O requests relative to the timespan of interest. Current I/O requests include the most recent requests generated by the tenant.

The analytics module 220 may be executed to compare the current usage metric for a tenant to the priority established for the tenant. The analytics module 220 may repeat the comparison for each tenant in the system. If the usage metric for a tenant exceeds its priority, the throttling module 225 may be executed to throttle the tenant. Throttling may include imposing a delay in communication or transmission of I/O requests to the computing resource. The delay may be based upon the severity of the overuse of the computing resource by the tenant. That is, the greater the difference between the usage metric and the priority, the more delay may be imposed upon the tenant. The exact amount of the delay is configurable, but an exemplary delay may include a delay time of approximately zero to 200 microseconds in duration.

Because the usage metric for a tenant may be continually or automatically updated, the delay duration imposed upon the tenant may be increased or decreased in a stepwise manner. For example, if the analytics module 220 determines that a tenant is exceeding its allotted I/O request quota (e.g., priority), the tenant may be throttled by imposing a delay to the transmission of its requests to the computing resource. Subsequent updating of the usage module some time later may indicate that the tenant is still exceeding its priority. Therefore the throttling module 225 may increase the delay duration by another ten microseconds. The throttling module 225 may also decrease the delay duration in a stepwise fashion as the difference between the usage metric and the priority begins to recede. The ten microsecond step up or down is a configurable amount, and is just a reference amount for this example.

The ability of the throttling kernel 200 to selectively throttle I/O request of the tenants ensures that access to computing resources is allotted fairly across the tenants, according to priority. Furthermore, these types of short microsecond delay durations will not create deleterious performance issues for the tenants.

Upon throttling of a tenant, the interleaving module 230 may be executed to transmit I/O requests for the other tenants to the computing resource during the duration of the delay imposed against the tenant that exceeded their priority. That is, I/O requests generated by other tenants may be interleaved in between I/O requests generated by the tenant that has exceeded its usage. This functionality is particularly important when a tenant has a relatively high priority relative to the other tenants, or a tenant is alone capable of monopolizing access to the computing device, for example, by large transfers of write requests to a storage media.

As mentioned above, in some embodiments, the throttling kernel 200 may employ a global priority to each tenant within the multi-tenant system. The analytics module 220 may compare the raw request data for each tenant to the global priority value and throttle tenants that generate requests for the computing resource that exceed the global priority. In other embodiments, the throttling kernel 200 may simply compare raw request numbers for each of the tenants relative to one another and selectively throttle tenants as their raw request numbers increase or decrease over time.

Figure 3:
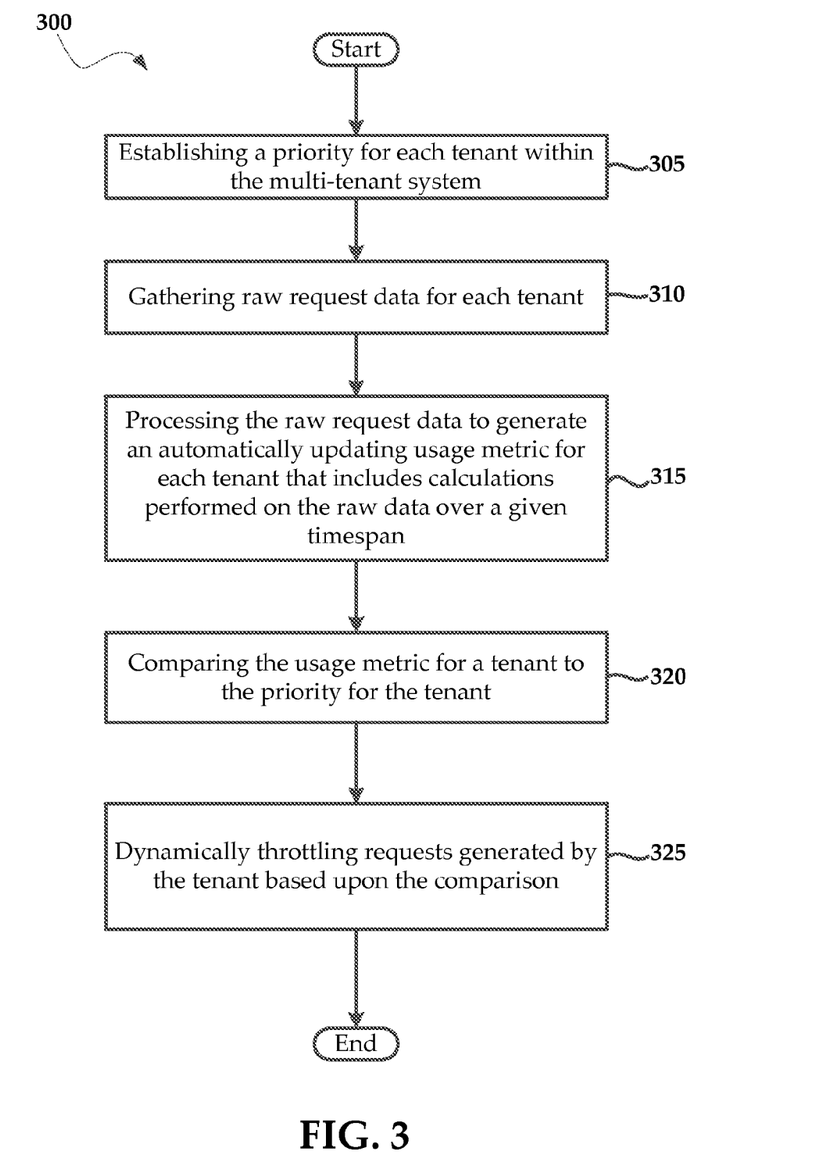
FIG. 3 is a flowchart of an exemplary method for managing requests for computing resources.

FIG. 3 illustrates a flowchart of an exemplary method 300 for managing requests for computing resources. It will be understood that the computing resource may be subject to a workload imposed thereon by a plurality of tenants, such as tenants within a multi-tenant system (e.g., a cloud). The method may include a step 305 of establishing a priority for each tenant within the multi-tenant system.

The method may then include a step 310 of gathering raw request data for each tenant along with a step 315 of processing the raw request data to generate an automatically updating usage metric for each tenant that includes calculations performed on the raw data over time. As stated before, the usage metric may be weighted using an exponentially decayed average.

The method may also include a step 320 of comparing the usage metric for a tenant to the priority for the tenant along with a step 325 of dynamically throttling requests generated by the tenant based upon the comparison. Again, as mentioned previously, the duration of delay applied to the requests of a tenant may be selectively varied as the usage metric changes over time.

The usage metric may be utilization-based, but it can also be based on other metric types, for example, I/O per second (IOPS), a sum of latency, or other metrics. It is noteworthy that utilization, in some contexts (e.g., queuing theory) has a specific meaning: the time a resource was busy.

In some embodiments, the users in the virtualized environment have full I/O access at the start regardless of the size of their virtual machine or zone or their assigned priority. Subsequently, the resources can be limited by blocking access for variable periods of time. This approach may be analogous to metering lights on a freeway entrance. Sometimes the lights are green when the user needs resources, and other times the user has to wait. This time sharing may be accomplished, in some embodiments, in a virtualized hypervisor environment.

Figure 4:
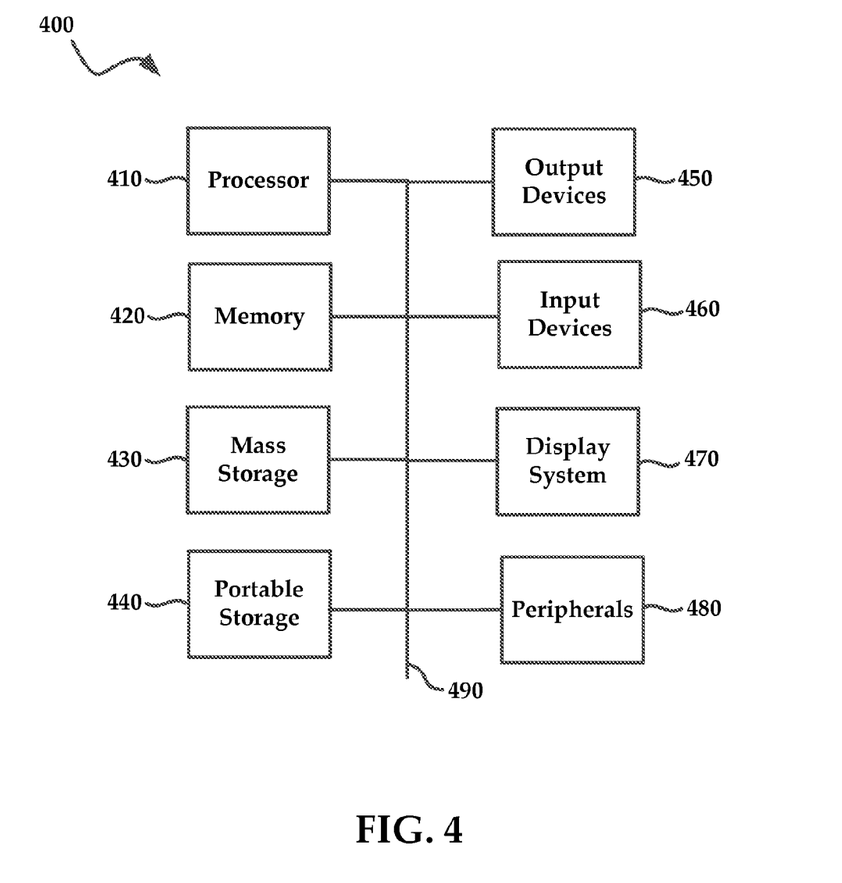
FIG. 4 illustrates an exemplary computing system that may be used to implement embodiments according to the present technology.

FIG. 4 illustrates an exemplary computing system 400 that may be used to implement an embodiment of the present technology. One or more aspects of the computing system 400 may be implemented within any of multi-tenant system 105, client device 115, and/or computing resource 130. The computing system 400 of FIG. 4 includes one or more processors 410 and main memory 420. Main memory store 420 stores, in part, instructions and data for execution by processor 410. Main memory store 420 can store the executable code when the system 400 is in operation. The system 400 of FIG. 4 may further include a mass storage device 430, portable storage medium drive(s) 440 (also referred to as portable storage device 440), output devices 450, user input devices 460 (also referred to as input devices 460), a graphics display 470 (also referred to as display system 470), and other peripheral devices 480.

The components shown in FIG. 4 are depicted as being connected via a single bus 490. The components may be connected through one or more data transport means. Processor unit 410 and main memory store 420 may be connected via a local microprocessor bus, and the mass storage device 430, peripheral device(s) 480, portable storage device 440, and display system 470 may be connected via one or more input/output (I/O) buses.

Mass storage device 430, which may be implemented with a magnetic disk drive, an optical disk drive, or other storage media, is a non-volatile storage device for storing data and instructions for use by processor unit 410. Mass storage device 430 can store the system software for implementing embodiments of the present technology for purposes of loading that software into main memory store 420.

Portable storage device 440 operates in conjunction with a portable non-volatile storage medium, such as a floppy disk, compact disk or digital video disc, to input and output data and code to and from the computing system 400 of FIG. 4. The system software for implementing embodiments of the present technology may be stored on such a portable medium and input to the computing system 400 via the portable storage device 440.

Input devices 460 provide a portion of a user interface. Input devices 460 may include an alphanumeric keypad, such as a keyboard, for inputting alphanumeric and other information, or a pointing device, such as a mouse, a trackball, stylus, or cursor direction keys. Additionally, the system 400 as shown in FIG. 4 includes output devices 450. Suitable output devices include speakers, printers, network interfaces, and monitors.

Display system 470 may include a liquid crystal display (LCD) or other suitable display device. Display system 470 receives textual and graphical information, and processes the information for output to the display device.

Peripherals 480 may include any type of computer support device to add additional functionality to the computing system. Peripheral device(s) 480 may include a modem or a router.

The components contained in the computing system 400 of FIG. 4 are those typically found in computing systems that may be suitable for use with embodiments of the present technology and are intended to represent a broad category of such computer components that are well known in the art. Thus, the computing system 400 of FIG. 4 can be a personal computer, hand held computing system, telephone, mobile computing system, workstation, server, minicomputer, mainframe computer, or any other computing system. The computer can also include different bus configurations, networked platforms, multi-processor platforms, etc. Various operating systems can be used including UNIX, Linux, Windows, Mac OS, Palm OS, SmartOS, and other suitable operating systems.

Some of the above-described functions may be composed of instructions that are stored on storage media (e.g., computer-readable medium). The instructions may be retrieved and executed by the processor. Some examples of storage media are memory devices, tapes, disks, SSDs (solid-state drives), and the like. The instructions are operational when executed by the processor to direct the processor to operate in accord with the technology. Those skilled in the art are familiar with instructions, processor(s), and storage media.

It is noteworthy that any hardware platform suitable for performing the processing described herein is suitable for use with the technology. The terms "computer-readable storage medium" and "computer-readable storage media" as used herein refer to any medium or media that participate in providing instructions to a CPU for execution. Such media can take many forms, including, but not limited to, non-volatile media, volatile media and transmission media. Non-volatile media include, for example, optical or magnetic disks, such as a fixed disk. Volatile media include dynamic memory, such as system RAM. Transmission media include coaxial cables, copper wire and fiber optics, among others, including the wires that comprise one embodiment of a bus. Transmission media can also take the form of acoustic or light waves, such as those generated during radio frequency (RF) and infrared (IR) data communications. Common forms of computer-readable media include, for example, a floppy disk, a flexible disk, a hard disk, magnetic tape, any other magnetic medium, a CD-ROM disk, digital video disk (DVD), any other optical medium, any other physical medium with patterns of marks or holes, a RAM, a PROM, an EPROM, an EEPROM, a FLASHEPROM, any other memory chip or data exchange adapter, a carrier wave, or any other medium from which a computer can read.

The above description is illustrative and not restrictive. Many variations of the technology will become apparent to those of skill in the art upon review of this disclosure. The scope of the technology should, therefore, be determined not with reference to the above description, but instead should be determined with reference to the appended claims along with their full scope of equivalents.

In the foregoing specification, the invention is described with reference to specific embodiments thereof, but those skilled in the art will recognize that the invention is not limited thereto. Various features and aspects of the above-described invention can be used individually or jointly. Further, the invention can be utilized in any number of environments and applications beyond those described herein without departing from the broader spirit and scope of the specification. The specification and drawings are, accordingly, to be regarded as illustrative rather than restrictive. It will be recognized that the terms "comprising," "including," and "having," as used herein, are specifically intended to be read as open-ended terms of art.

What is claimed is:

1. A method for managing requests for computing resources, the method comprising:
dynamically throttling requests for computing resources generated by one or more tenants within a multi-tenant system, the requests being directed to a computing resource, the requests of a tenant being selectively throttled based upon a comparison of a usage metric and a priority for the tenant; and
automatically updating the usage metric for the tenant by continually calculating, for a given time measurement, the usage metric by multiplying an aggregate number of read requests for the tenant over the time measurement by an average read latency relative to the computing resource, plus a product of a number of write requests and the average write latency relative to the computing resource.

2. The method according to claim 1, wherein the usage metric comprises I/O per second.

3. The method according to claim 1, wherein the usage metric comprises a sum of latency.

4. The method according to claim 1, wherein the usage metric comprises a time-based metric.

5. The method according to claim 1, wherein the aggregate numbers of read and write requests both include an exponentially decayed average, wherein older requests are requests from the tenant that occurred prior to recent requests relative to the time measurement, wherein recent requests include the most recent requests generated by the tenant, further wherein the older requests comprise a weight that is less than a weight of recent requests.

6. The method according to claim 1, wherein the usage metric is calculated on at least one of a rolling average or an exponential decay basis.

7. The method according to claim 1, wherein automatically updating further includes automatically comparing the updated usage metric for the tenant to the priority for the tenant and increasing or decreasing the selective throttling of the requests by a predetermined amount based upon the comparison.

8. The method according to claim 1, wherein the amount of throttling that is applied to the tenant is based upon a difference between the usage metric and the priority of the tenant.

9. The method according to claim 1, wherein the priority for the tenant may be based upon a pricing structure.

10. The method according to claim 1, wherein the computing resource comprises a physical storage media that can process a predetermined number of I/O requests within a given timespan.

11. The method according to claim 1, further comprising interleaving requests from unthrottled tenants to the computing resource.

12. A method for managing requests for computing resources, the method comprising:
dynamically throttling requests for computing resources generated by one or more tenants within a multi-tenant system, the requests being directed to a computing resource that receives fluctuating quantities of requests from the multi-tenant system; and
assigning a usage metric to each tenant of the multi-tenant system, wherein the usage metric allows the multi-tenant system to selectively throttle requests by the tenant within a time measurement;
wherein the one or more tenants that are selectively throttled are determined by comparing a raw number of requests generated each tenant and by selecting the one or more tenants with the greatest amount of requests relative to the other tenants; and
wherein the usage metric is automatically updated for a tenant by continually calculating, for a given a time measurement, by multiplying an aggregate number of read requests for the tenant over the time measurement by an average read latency relative to the computing resource, plus a product of a number of write requests and the average write latency relative to the computing resource.

13. The method according to claim 12, wherein the one or more tenants that are selectively throttled is further determined based upon a comparison of the usage metric and a priority for the tenant.

14. The method according to claim 13, wherein the usage metric comprises at least one of I/O per second, a sum of latency and a time-based metric.

15. A system for managing requests for computing resources, the system comprising:
a processor that executes computer-readable instructions;
a memory for storing executable instructions that include
an operating system that has a filesystem; and
a throttling module that manages requests for computing resources by dynamically throttling requests for computing resources generated by one or more tenants within a multi-tenant system, the requests being directed to a computing resource that receives fluctuating quantities of requests from the multi-tenant system, the requests of a tenant being selectively throttled based upon a comparison of a usage metric and a priority for the tenant, the throttling module automatically updating the usage metric for the tenant by continually calculating, for a given a time measurement, the usage metric by multiplying an aggregate number of read requests for the tenant over the time measurement by an average read latency relative to the computing resource, plus a product of a number of write requests and the average write latency relative to the computing resource.

16. The system according to claim 15, wherein the usage metric comprises at least one of I/O per second, a sum of latency and a time-based metric.

17. The system according to claim 15, wherein the aggregate numbers of read and write requests both include older requests, wherein older requests are requests from the tenant that occurred prior to recent requests relative to the time measurement, further wherein the older requests comprise a weight that is less than a weight of current requests.

18. The system according to claim 15, wherein a metric generator calculates the usage metric for the tenant on at least one of a rolling average or an exponential decay basis.

19. The system according to claim 18, wherein the metric generator further automatically updates the usage metric by automatically comparing the updated usage metric for the tenant to the priority for the tenant and increasing or decreasing the selective throttling of the requests by a predetermined amount based upon the comparison.

20. The system according to claim 15, further comprising a priority module that assigns the priority to each tenant of the multi-tenant system, wherein the priority includes an amount of requests that may be performed by the tenant within the time measurement.

21. The system according to claim 15, wherein the throttling module selectively varies the amount of throttling that is applied to the tenant is based upon a difference between the usage metric and the priority of the tenant.

22. The system according to claim 15, wherein the usage metric for the tenant is stored in kernel memory of the filesystem.

23. The system according to claim 15, further comprising an interleaving module that interleaves requests from unthrottled tenants to the computing resource.

24. A system for managing requests for computing resources, the system comprising:
a processor that executes computer-readable instructions;
a memory for storing executable instructions that include
an operating system that has a filesystem;
a throttling module that manages requests for computing resources by dynamically throttling requests for computing resources generated by one or more tenants within a multi-tenant system, the requests being directed to a computing resource that receives fluctuating quantities of requests from the multi-tenant system, the requests of a tenant being selectively throttled based upon a comparison of a usage metric and a priority for the tenant; and
a metric generator that automatically updates the usage metric for the tenant by continually calculating, for a given a time measurement, the usage metric by multiplying an aggregate number of read requests for the tenant over the time measurement by an average read latency relative to the computing resource, plus a product of a number of write requests and the average write latency relative to the computing resource.

* * * * *